(12) United States Patent
Bonifer

(10) Patent No.: US 7,288,189 B2
(45) Date of Patent: Oct. 30, 2007

(54) MULTI-FACETED INTAKE FILTER FOR AN AQUARIUM

(76) Inventor: Jeffery P. Bonifer, 13452 Keytone Rd., Woodbridge, VA (US) 22193

( * ) Notice: Subject to any disclaimer, the term of this patent is extended or adjusted under 35 U.S.C. 154(b) by 292 days.

(21) Appl. No.: 11/054,942

(22) Filed: Feb. 11, 2005

(65) Prior Publication Data
US 2006/0180531 A1 Aug. 17, 2006

(51) Int. Cl.
A01K 63/04 (2006.01)
B01D 35/027 (2006.01)

(52) U.S. Cl. .............. 210/167.21; 210/232; 210/416.2; 210/460; 119/259; 264/DIG. 48

(58) Field of Classification Search .............. 210/232, 210/315, 416.1, 459, 416.2, 460, 488, 489, 210/167.21, 167.27; 264/DIG. 48; 119/259
See application file for complete search history.

(56) References Cited

U.S. PATENT DOCUMENTS

| | | | |
|---|---|---|---|
| 705,364 A * | 7/1902 | Kurtz | 210/170.01 |
| 3,160,588 A | 12/1964 | Alarie | |
| 3,206,939 A * | 9/1965 | Wilson | 62/50.7 |
| 3,301,402 A | 1/1967 | Falkenberg et al. | |
| 3,785,494 A | 1/1974 | Sama | |
| 3,865,729 A | 2/1975 | Baensch | |
| 3,899,424 A | 8/1975 | Lake | |
| 3,947,362 A | 3/1976 | Tani | |
| 4,058,465 A * | 11/1977 | McKee | 210/356 |
| 4,081,371 A * | 3/1978 | Yarwood et al. | 75/412 |
| 4,512,885 A | 4/1985 | Willinger | |
| 4,602,996 A | 7/1986 | Willinger | |
| 4,620,924 A | 11/1986 | Goldman et al. | |
| 4,622,148 A | 11/1986 | Willinger | |
| D294,172 S | 2/1988 | Willinger | |
| 4,735,715 A | 4/1988 | Willinger | |
| 4,761,227 A | 8/1988 | Willinger et al. | |
| 4,842,727 A | 6/1989 | Willinger et al. | |
| 4,861,468 A | 8/1989 | Willinger et al. | |
| 4,877,526 A | 10/1989 | Johnson et al. | |
| 4,944,871 A * | 7/1990 | Ogawa | 210/167.25 |
| 5,011,600 A * | 4/1991 | Mowka et al. | 210/167.24 |
| 5,087,357 A | 2/1992 | Villa | |
| 5,089,108 A | 2/1992 | Small | |

(Continued)

FOREIGN PATENT DOCUMENTS

JP 8-84904 * 4/1996

(Continued)

*Primary Examiner*—Fred G. Prince
(74) *Attorney, Agent, or Firm*—Diederiks & Whitelaw, PLLC

(57) ABSTRACT

A multi-faceted intake filter for an aquarium includes a top surface portion, a bottom surface portion and a plurality of side surface portions that collectively define a filter body is formed from a compressible foam. The intake filter also includes a bore that extends along a longitudinal axis of the filter body. The bore includes a first end exposed at the top surface portion that leads to a second end which terminates prior to the bottom surface portion. The bore is designed to receive an intake portion of an aquarium filter tube. Preferably, the bore is off-set from a central axis of the filter body. The off-set bore allows the intake filter to be placed in a wide range of aquarium configurations, with at least one of the side surface portions abutting a wall of the aquarium.

15 Claims, 3 Drawing Sheets

U.S. PATENT DOCUMENTS

| | | | |
|---|---|---|---|
| 5,164,089 A | * 11/1992 | Preston | 210/615 |
| 5,176,824 A | 1/1993 | Willinger et al. | |
| 5,203,990 A | 4/1993 | Gargiulo | |
| 5,207,900 A | 5/1993 | Findell | |
| 5,246,571 A | 9/1993 | Woltmann | |
| 5,372,718 A | * 12/1994 | Zebian | 210/301 |
| 5,547,568 A | * 8/1996 | Sasaki | 210/172.4 |
| 5,626,747 A | 5/1997 | Ritzow et al. | |
| 5,942,105 A | 8/1999 | Leis | |
| 6,051,132 A | 4/2000 | Flores | |

FOREIGN PATENT DOCUMENTS

| | | | |
|---|---|---|---|
| JP | P2004-230207 | * | 8/2004 |

* cited by examiner

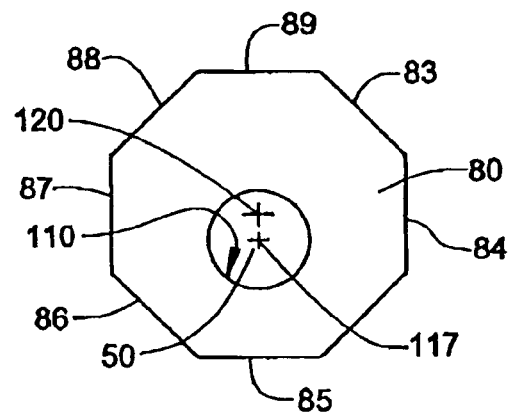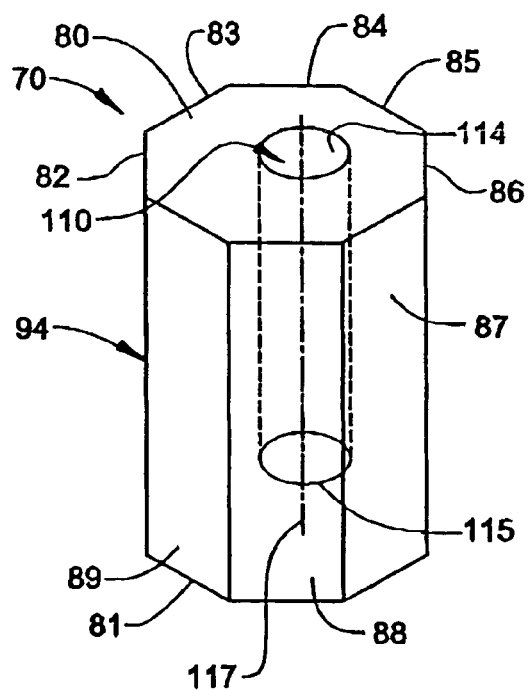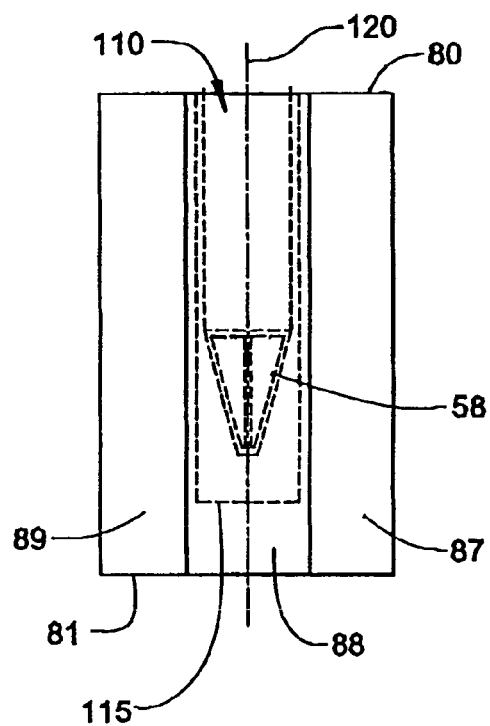

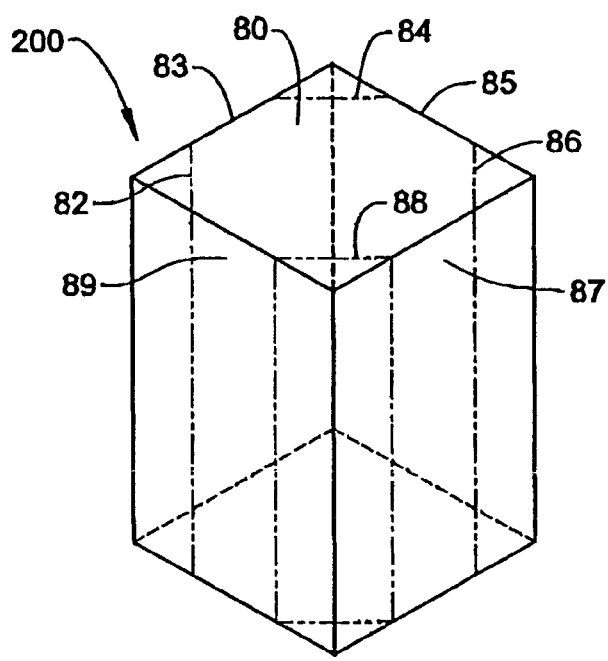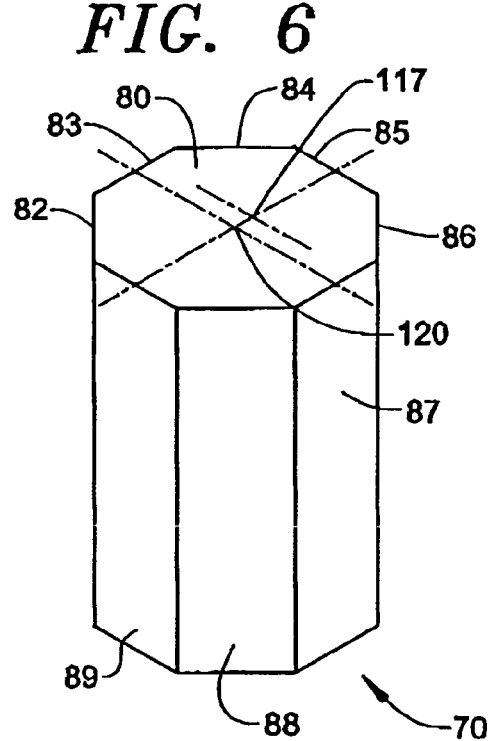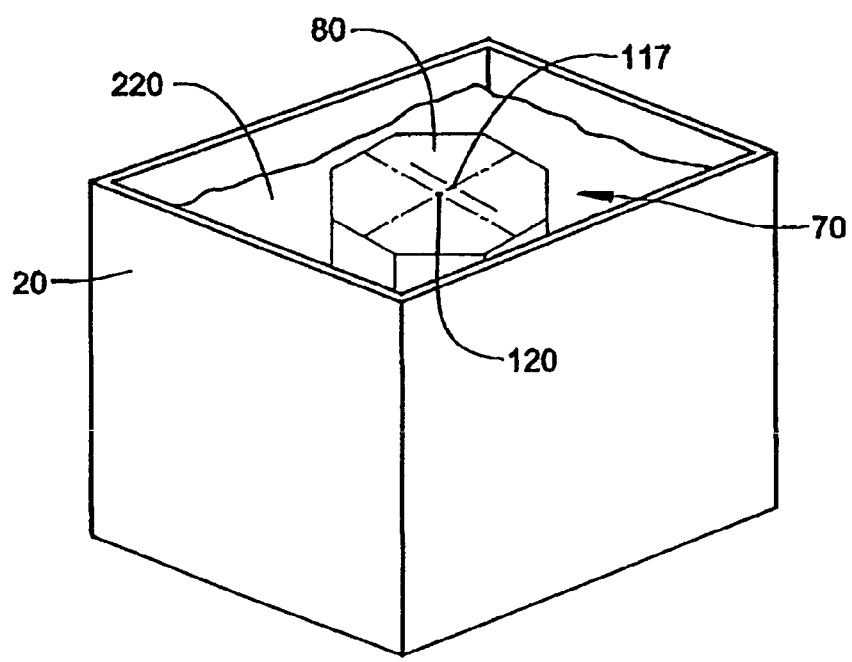

MULTI-FACETED INTAKE FILTER FOR AN AQUARIUM

BACKGROUND OF THE INVENTION

1. Field of the Invention

The present invention pertains to the art of aquariums and, more particularly, to an intake tube filter for an aquarium.

2. Discussion of the Prior Art

At present, aquarium filters are of two general types. The first type constitutes under-gravel filters which are placed on a bottom of an aquarium and filtered with gravel so that the entire floor of the aquarium acts as a filter. The second type is defined by above gravel filters which function to draw in fluid from above the bottom of the aquarium and subsequently pass the fluid through a filter prior to re-introducing the fluid back into the aquarium. For instance, it is known to draw in fluid through an intake tube of a filter that is suspended above the bottom of the aquarium. The fluid is then directed through an enclosure arranged outside the aquarium prior to being sent back to the aquarium. The enclosure is packed with a filter medium, such as charcoal, synthetic floss or the like, to cleanse the fluid.

Above gravel filters possess certain drawbacks. More specifically, external filters typically employ a filter tube having an intake provided with a strainer or the like that prevents fish from being drawn into the filter. However, strainers are designed to keep out larger fish, not smaller fish. For instance, fry and other small fish can often pass through the strainer and wind up in the filter. To address this problem, while also providing an additional degree of filtration, it has been proposed to place a filter over the intake. Unfortunately, available intake filters are essentially only fit to a particular intake tube, rather than to the tank. This creates a serious concern as fish can become trapped between the intake filter and a wall of the aquarium. Unless this condition is discovered quickly, the fish may be fatally harmed.

Based on the above, there exists a need for a filter for an intake tube wherein the filter is specifically designed to protect fish from being undesirably trapped between the filter tube and a wall of an aquarium. More specifically, there exists a need for a filter that can be universally fit to a wide variety of filter tubes, while preventing the ingestion of smaller fish or fry and, at the same time, ensuring that fish are not caught and trapped between the filter and a wall of the aquarium. In addition, there exists a need for an intake tube filter which is capable of performing at least a substantial portion of the filtering function.

SUMMARY OF THE INVENTION

The present invention is directed to a filter for an intake tube of an aquarium filter assembly. In accordance with the invention, the intake filter includes a top surface portion, a bottom surface portion and a plurality of side surface portions that collectively define a multi-faceted filter body. The filter body is preferably formed from a compressible foam-like material. Once in place, at least one of the side surface portions abuts a wall of the aquarium in order to prevent fish from become trapped between the intake filter and the aquarium wall. In further accordance with the invention, the intake filter includes a bore that extends along a longitudinal axis of the filter body. More specifically, the bore includes a first end exposed at the top surface portion that leads to a second end which terminates prior to the bottom surface portion. The bore is designed to receive an end portion of the intake tube. Given that the intake filter is formed from a compressible material, the bore will accept a wide range of filter tube diameters.

In the most preferred form of the invention, the bore is off-set from a central longitudinal axis of the filter body. That is, the distance between a center of the bore and a plurality of the side surface portions varies. With this arrangement, the intake filter can be positioned on the intake portion of a filter tube and oriented so that one of the side surface portion abuts a wall of the aquarium. In this manner, the intake tube can assume a number of different positions to accommodate a wide range of tube/wall spacing configurations.

In accordance with another aspect of the invention, the intake filter is formed by immersing a foam block in a brine or saltwater mixture and then subjecting the intake filter to low temperatures to cause freezing of the mixture. Once sufficiently frozen, the intake filter can be cut into a multi-faceted member and the bore drilled to accommodate an intake tube. Again, the bore preferably extends along a longitudinal axis of the foam block, while being offset from a longitudinal centerline, such that various face portions of the intake filter will be varying distances from the bore. With this arrangement, the filter can be placed on an aquarium intake tube, while being adjustable to assure that one of the face portions of the filter abuts a wall of the aquarium.

Additional objects, features and advantages of the present invention will become more readily apparent from the following detailed description of a preferred embodiment when taken in conjunction with the drawings wherein like reference numerals refer to corresponding parts in the several views.

BRIEF DESCRIPTION OF THE DRAWINGS

FIG. 2 is a perspective view of the intake filter of the present invention;

FIG. 3 is a top, elevational view of the intake filter of FIG. 2;

FIG. 4 is a side elevational view of the intake filter of FIG. 2;

FIG. 5 is a perspective view of an intake filter prior to forming side surface portions and a central bore;

FIG. 6 is a perspective view of the intake filter illustrating locating marks for central axis and an off-set axis; and FIG. 7 is a perspective view of the intake filter immersed in an aqueous solution prior to being frozen.

DETAILED DESCRIPTION OF THE PREFERRED EMBODIMENT

Figure 1:
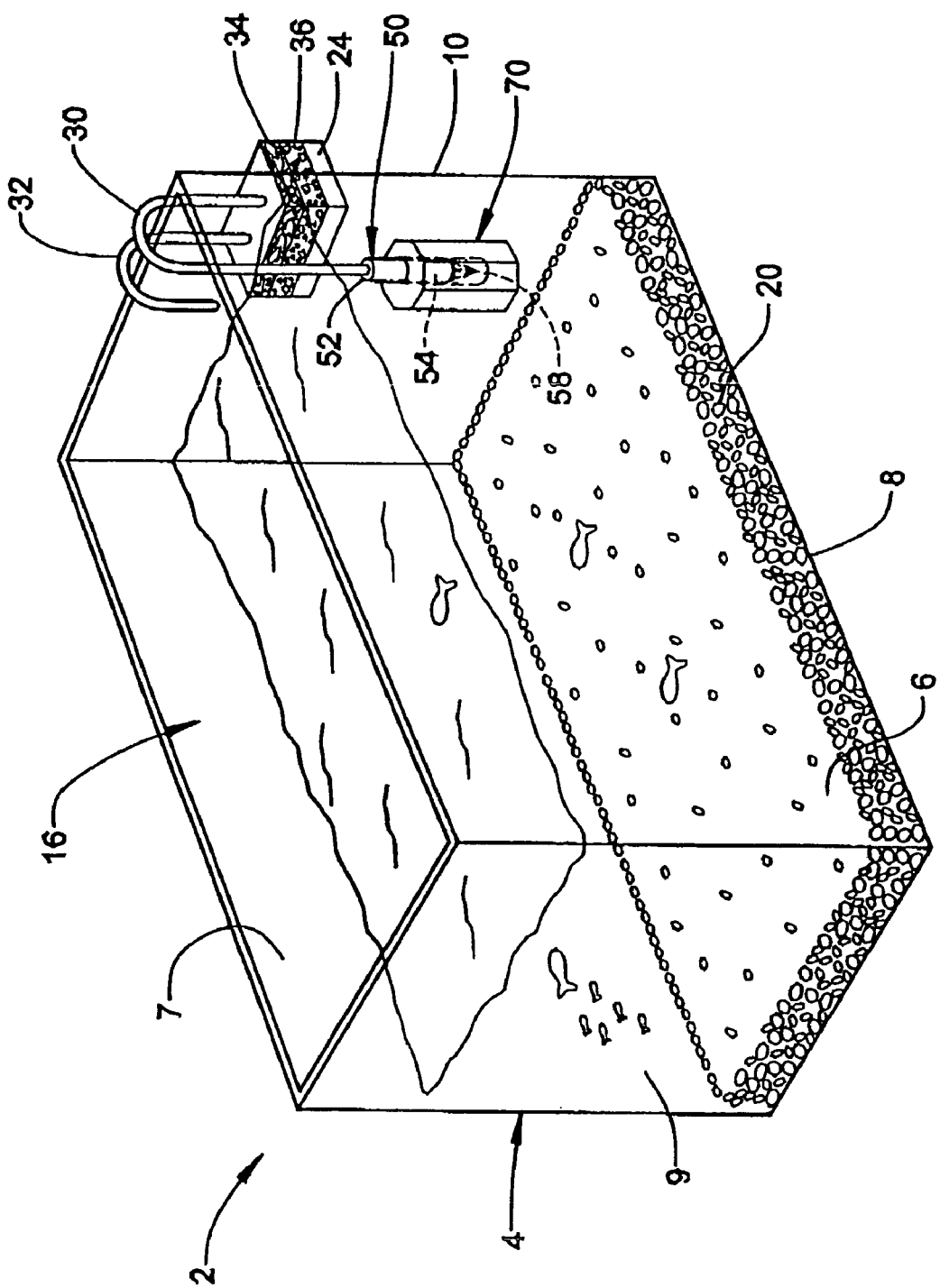
FIG. 1 is an upper right perspective view of an aquarium incorporating a multi-faceted intake filter constructed in accordance with the present invention.

With initial reference to FIG. 1, an aquarium assembly constructed in accordance with the present invention is generally indicated at 2. Aquarium assembly 2 includes a tank 4 having front, back, bottom and opposing side walls 6-10 that collectively define a reservoir 16. As depicted, a gravel base 20 is provided within tank 4 at bottom wall 8. A pump 24, shown mounted along wall 10, includes an inlet portion 30 that receives fluid from tank 4 and an outlet portion 32 that re-introduces filtered fluid back into tank 4. Certainly, pump 24 could also be mounted to any one of wall 6, 7, 9 and 10, or remote from tank 4, depending upon a particular installation. In the embodiment shown, pump 24 is shown mounted to an enclosure 34 having contained therein a filtering medium 36, such as synthetic floss or charcoal. Of course, many other filtering mediums can be placed within enclosure 34 depending upon the particular requirements of aquarium assembly 2.

Inlet portion 30 of pump 24 is connected to a filter tube 50. As shown, filter tube 50 includes a first end 52 that joins with inlet portion 30 leading to a second end 54. If desired, a strainer 58 can be provided on second end 54 of filter tube 50. In general, the structure described above is known in the art and presented for the sake of completeness. Instead, the present invention is directed to providing an intake filter 70 for intake tube 50.

With reference to FIGS. 2-4, intake filter 70 is formed from compressible foam and includes a top surface portion 80, a bottom surface portion 81 and a plurality of side surface portions or faces 82-89 that collectively define a filter body 94. Actually, given the particular arrangement of side surface portions 82-89, filter body 94 is multi-faceted, e.g. generally octagonal in cross-section in the preferred embodiment shown. That is, side surface portions 82-89 form a plurality of opposing pairs including: 82, 86; 83, 87; 84, 88; and 85,89. By employing a compressible foam, not only will intake filter 70 be adapted to receive a wide range of filter tubes 50, the foam provides a medium which fosters the growth of beneficial bacteria. In order to receive filter tube 50, intake filter 70 is provided with a bore 110. Bore 110 is generally cylindrical in shape having a first end 114 which is exposed at top surface portion 80 and leads to a second end 115. As shown, second end 115 of bore 110 preferably terminates prior to reaching bottom surface portion 81 as will be discussed further below. Bore 110 extends along an axis 117 that is off-set from a central, longitudinal axis 120 of filter region 94. By positioning bore 110 along off-set axis 117, a distance, generally indicated at Y with respect to side surface portion 86, between axis 117 and each of the plurality of side surface portions 82-89 varies.

In accordance with one aspect of the invention, it is desired to have one of side surface portions 82-89 directly abut a wall 6, 7, 9 or 10 adjacent filter tube 50, i.e., side wall 10 in the embodiment shown. This configuration is provided to assure that fish cannot become trapped between intake filter 70 and side wall 10. Given the varying distances between side surface portions 82-89 and bore 110, intake filter 70 can be placed at or rotated to various orientations to accommodate various spacings between inlet portion 30 of intake tube 50 and side wall 10 of aquarium 2. Additionally, bore 110 is sized so as to readily accept most commercially available filter tubes in order to accommodate the widest possible range of aquarium applications. In preferred embodiments, intake filter 70 has a width of approximately 2.5-3.0 inches (about 6.3-7.6 cm), a height of approximately 4 inches (about 10.2 cm) and a bore diameter ranging from ⅝-1 inch (1.6-2.5 cm). In any case, given the size of bore 110 and the compressibility of the material employed in the construction of intake filter 70, most available filter tubes can be snugly inserted into bore 110.

Having described the preferred structure for intake filter 70, a method of forming intake filter 70 will now be described with particular reference to FIGS. 5-7. In order to initially form intake filter 70, a foam block 200, preferably having a generally square cross-section, is marked along the plurality of side surface portions 82-89. In addition, central axis 120 is located and marked on top surface portion 80. Once central axis 120 is marked, off-set axis 117 is located and another mark is provided on top surface portion 80. Foam block 200 is then immersed in a basin 210 filled with an aqueous brine mixture or solution 220 and thereafter exposed to low temperatures until frozen. Preferably, the aqueous brine solution formed from a mixture of water and salt is employed, with the salt preferably constituting sodium silicoaluminate. Although the mixture could vary in accordance with the invention, a preferred mixture is formed by adding ⅛ tablespoon of salt to one cup of water.

Once foam block 200 has been sufficiently frozen, bore 110 is drilled from top surface portion 80 down into body 94 along off-set axis 117 such as illustrated in FIGS. 2-4. In addition, side surface portions 82-89 are formed through a cutting operation. As this point, it should be noted that side surface portions 82-89 could be formed prior to immersing foam block 200. As shown, bore 110 preferably does not extend completely through filter body 94. Instead, bore 110 terminates prior to bottom surface portion 81 to provide added filtering area and to assure that fish in tank 4 cannot have access to the area of strainer 58. In any case, once bore 110 is formed, intake filter 70 is allowed to thaw and is thereafter readily for use. At this point, it should be noted that the freezing of foam block 200 is considered to greatly enhance the ability of bore 110 to be formed, while not affecting the overall filtering properties of filter body 94.

With the above-described arrangement, the present invention provides for a filter to an intake tube of an aquarium that can be adjusted to a variety of different environments while, at the same time, ensuring that small fish cannot be ingested into an intake of the aquarium or become lodged between a wall of the aquarium and the intake tube. The present invention is particularly suitable to breeder tanks in that the intake filter will prevent fry from being drawn into the intake tube, regardless of the existence of or screen size associated with a strainer on the intake tube. In addition to providing a safety feature for the fish of an aquarium, the intake filter of the invention has been found to perform the majority of the filtering function for the aquarium, requiring the infrequent need to clean the charcoal or other filtering medium of the aquarium. In general, to clean the intake filter of the invention for repeated use, it is only necessary to slip the filter off the intake tube, rinse and squeeze the same under a flow of clean water and reposition the filter on the intake tube.

Although described with reference to a preferred embodiment of the invention, it should be readily understood that various changes and/or modifications can be made to the invention without departing from the spirit thereof. For instance, while the intake filter is shown having eight sides, the overall number of sides can be varied without departing from the spirit of the present invention. In general, the invention is only intended to be limited by the scope of the following claims.

I claim:

1. An aquarium assembly comprising:
   a tank including front, back, bottom and opposing side walls that collectively define a reservoir for holding fluid;
   a pump having an inlet portion and an outlet portion;
   a filter tube having a first end fluidly connected to the inlet of the pump and a second end defining an intake suspended in the reservoir above the bottom wall of the tank; and
   a multi-faceted intake filter for filtering fluid entering the intake of the filter tube wherein, upon activation of the pump, fluid from the reservoir is drawn through the filter body prior to reaching the intake, said intake filter including:
      a top surface portion, a bottom surface portion and a plurality of side surface portions that collectively define a filter body, said filter body being formed from a compressible foam and having a central axis; and a bore extending longitudinally into the filter body offset from the central axis, said bore having a first end exposed at the top surface portion leading to a second end that terminates prior to the bottom surface portion, said intake of the filter tube projecting into the bore while at least one of said plurality of side surface portions of the intake filter abuts one of the front, back and opposing side walls of the tank.

2. A multi-faceted intake filter for filtering fluid entering an intake of an aquarium filter tube comprising:

a top surface portion, a bottom surface portion and a plurality of side surface portions that collectively define a filter body, said filter body being formed from foam and having a central axis; and a bore extending longitudinally into the filter body offset from the central axis, said bore having a first end exposed at the top surface portion leading to a second end that terminates prior to the bottom surface portion, wherein an intake of a filter tube is adapted to project into the bore.

3. The intake filter according to claim 2, wherein the plurality of side surface portions are arranged in opposing pairs.

4. The intake filter according to claim 3, wherein the plurality of side surface portions are arranged in four opposing pairs so as to establish a generally octagonal cross-section for the filter body.

5. An aquarium assembly comprising:

a tank including front, back, bottom and opposing side walls that collectively define a reservoir for holding fluid;

a pump having an inlet portion and an outlet portion;

a filter tube having a first end fluidly connected to the inlet of the pump and a second end defining an intake suspended in the reservoir above the bottom wall of the tank; and a multi-faceted intake filter for filtering fluid entering the intake of the filter tube wherein, upon activation of the pump, fluid from the reservoir is drawn through the filter body prior to reaching the intake, said intake filter including:

a top surface portion, a bottom surface portion and a plurality of side surface portions that collectively define a filter body, said filter body being formed from a compressible foam; and a bore extending longitudinally into the filter body, said intake of the filter tube projecting into the bore while at least one of said side surface portions abuts one of the front, back and opposing side walls of the tank.

6. The aquarium according to claim 5, wherein said bore has a first end exposed at the top surface portion leading to a second end that terminates prior to the bottom surface portion.

7. The aquarium according to claim 5, wherein one of the plurality of side surface portions directly abuts one of the front, back and opposing side walls of the tank, with said one of the plurality of side surface portions being partially deflected by the wall.

8. The aquarium according to claim 5, wherein the plurality of side surface portions are arranged in opposing pairs.

9. The aquarium according to claim 8, wherein the plurality of side surface portions are arranged in four opposing pairs so as to establish a generally octagonal cross-section for the filter body.

10. The aquarium according to claim 5, wherein the bore is off-set from a central, longitudinal axis of the filter body.

11. A method of forming a filter for an aquarium filter assembly comprising:

forming a multi-faceted filter body having a top surface portion, a bottom surface portion and a plurality of side surface portions, said side surface portions being arranged in opposing pairs;

immersing the filter body in an aqueous solution;

freezing the filter body; and forming a bore in the filter body, said bore having a first end exposed at the top surface portion and extending longitudinally to a second end that is spaced from the bottom surface portion.

12. The method according to claim 11, further comprising:

locating a longitudinal central axis of the filter body; and forming the bore offset from the longitudinal central axis.

13. The method according to claim 11, wherein the aqueous solution is a mixture of water and salt.

14. The method of claim 13, wherein the salt constitutes sodium silicoaluminate.

15. The method of claim 14, wherein the mixture constitutes adding $1/8^{th}$ tablespoon of salt to one-cup of water.

* * * * *